Nov. 25, 1969  B. LITMAN ET AL  3,479,888
VIBRATION ATTENUATOR AND GYROSCOPE APPARATUS EMPLOYING SAME
Filed May 5, 1966  2 Sheets-Sheet 1

INVENTORS:
BERNARD LITMAN
EVERETT R. SILVIA
CHRISTOPHER STABILE
BY *Howson & Howson*
ATTYS.

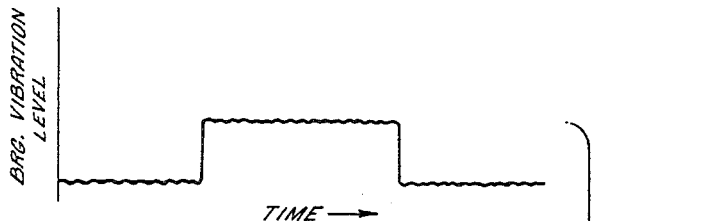
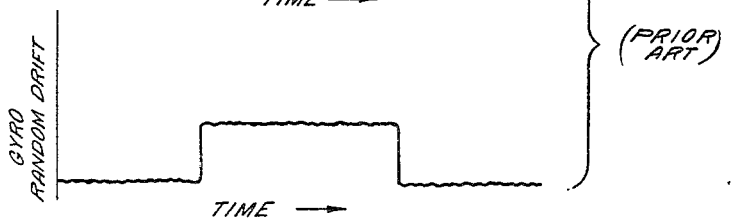
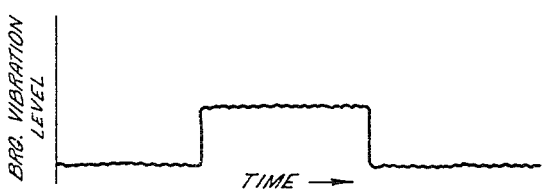
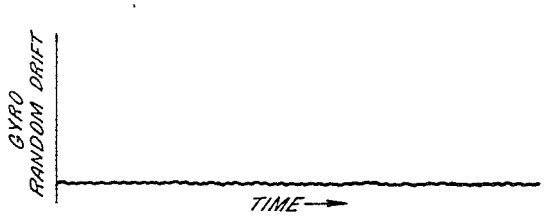
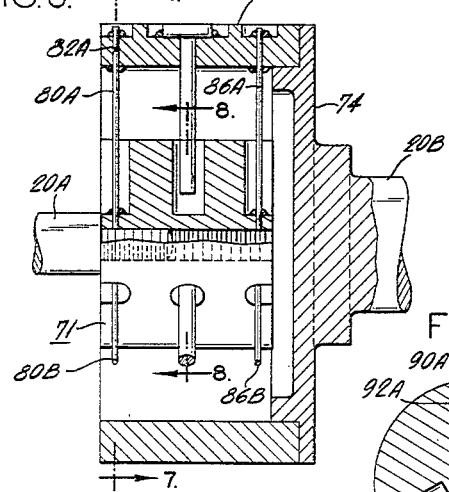
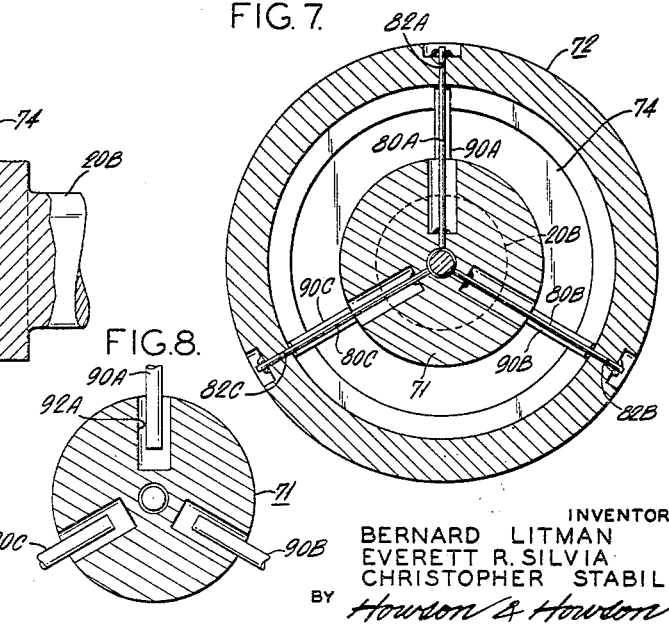
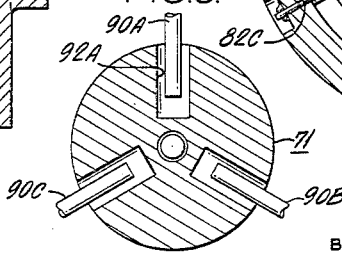

United States Patent Office 3,479,888
Patented Nov. 25, 1969

3,479,888
VIBRATION ATTENUATOR AND GYROSCOPE
APPARATUS EMPLOYING SAME
Bernard Litman, Wantagh, Everett R. Silvia, Huntington Station, and Christopher Stabile, Kings Park, N.Y., assignors to American Bosch Arma Corporation, Garden City, N.Y., a corporation of New York
Filed May 5, 1966, Ser. No. 547,934
Int. Cl. G01c 5/04
U.S. Cl. 74—5.5            15 Claims

ABSTRACT OF THE DISCLOSURE

A vibration attenuator is employed between the support bearing and the suspension of a rotating-suspension type gyro to reduce gyro drift due to vibrations transmitted to the support shaft by the bearing. The attenuator consists, in effect, of an inner and outer shaft connected together by sets of radially-extending axially-resilient support members, the sets of support members being displaced from each other along the shaft axis. Preferably each support member is affixed at one end to the interior side of a hollow inner cylindrical shaft, and extends through an aperture in the opposite wall of the inner shaft to be secured to the inner surface of the outer shaft, thereby providing a more compact structure for a given length of support member.

---

This invention relates to gyroscope apparatus and to vibration attenuators suitable for use therein.

In many applications of gyroscope apparatus, the frame on which the gyro rotor and its suspension are mounted is subject to mechanical vibrations of varying degrees of severity. Such vibrations, when transmitted to the gyro rotor, are capable of producing net torques on the gyro rotor and hence of producing undesired drift of the rotor spin axis. The deleterious effects of such vibrations are especially pronounced in certain types of gyroscopes employing a non-floated gyro rotor supported by a rotating suspension which spins with the rotor and which permits tilting of the rotor spin axis about at least one, and preferably about two, precession axes normal to the spin axis.

In one important class of such gyroscopes the rotor is supported by elastic members in the suspension, the suspension being rotatably supported by support means which usually also transmit the spinning torque to the gyro suspension. The method by which the inherent elastic restraint between the suspension and the rotor is reduced to acceptable levels varies with the particular gyro design. One particular class of such gyroscopes to which the present invention is particularly applicable is that shown and described in copending application Ser. No. 291,546, of Edwin W. Howe, filed June 28, 1963, entitled "Gyroscope Apparatus" and now Patent No. 3,301,073 and of common assignee herewith. In the preferred form of the latter device, an annular gyro rotor is mounted on an intermediate gimbal ring by means of a pair of torsionally-resilient coaxial pivots and the intermediate gimbal in turn is supported upon a pair of torsionally-resilient coaxial pivots which are disposed at right angles to the above-mentioned pair of pivots and which are connected to a rotatable supporting shaft. The supporting shaft is mounted in an appropriate bearing for rotation by a motor.

This general class of non-floated, rotating-suspension gyroscopes is particularly sensitive to mechanical vibration for several reasons. The absence of a flotation fluid and of mechanically-lossy structural materials results in a very lightly damped structure which responds with relatively large amplitude oscillations to random vibrations near the natural frequencies of mechanical resonance of the structure. Because the rotor suspension is angularly compliant, it is also generally relatively compliant with respect to translational motion, and its natural frequencies of vibration tend to be low. Inherent anisoelasticity of the rotor and suspension converts any such random vibrations into a net torque on the rotor and produces undesirable gyro drift.

In addition, because the rotor suspension rotates, it causes rectification of incoming mechanical vibrations occurring at frequencies which are synchronous with the frequency of spinning of the gyro rotor. For example, assume the existence of a relatively heavy spot on the rim of the gyro rotor and a synchronous series of pulses of axial acceleration, such as might be produced by an irregularity on the races of the bearing in which the support shaft is mounted. Since the pulses always occur when the heavy spot is in the same angular position about the spin axis, an average torque is exerted on the gyro rotor about an axis perpendicular to the support shaft and to a radius from the center of the rotor to the position occupied by the heavy spot when the axial pulse occurs. The magnitude of this torque is proportional to the radial separation between the centers of wheel mass and wheel suspension support. If, on the other hand, the axial pulses are non-synchronous, the torques thereby produced on the tgyro rotor are randomly distributed in direction, and their average effect on the rotor is zero.

While somewhat similar rectification of the effects of synchronous vibration occurs in the more usual fixed-suspension gyroscopes, in these devices the effective torque exerted on the rotor is proportional to the radial distance from the center of mass of the rotor to its spin axis, and with known dynamic balancing techniques this distance can be reduced to about ten micro-inches. In contrast, in the rotating suspension type of gyroscope, adjustment of the center of support with respect to the center of rotor mass is considerably more difficult and generally cannot be accomplished to better than about 100 micro-inches. Accordingly, gyroscopes of the rotating suspension type are likely to have ten times greater sensitivity to synchronous vibration. If in the latter type of gyroscope the synchronous vibrations are at or near the mechanical resonance frequency of the rotor suspension structure, resulting vibrations of the structure may in fact be so great as to damage it.

While it is known to mount the support bearing and motor on resilient vibration isolators, these measures have been found inadequate to prevent excessive gyro drift in a precision gyroscope in the presence of commonly-encountered random and/or synchronous vibrations.

Accordingly, it is an object of the invention to provide a new and useful form of gyroscope apparatus.

Another object is to provide such apparatus which has reduced sensitivity to mechanical vibration.

Another object is to provide a gyroscope apparatus of the class utilizing a gyroscope rotor resiliently mounted on a rotatable support means of a rotating suspension, in which the sensitivity of the gyroscope to vibration is reduced.

It is also an object to provide such gyroscope apparatus which is compact and dynamically balanced.

A further object is to provide a new and useful vibration attenuator, suitable for use in gyroscope apparatus.

In accordance with the invention in one of its aspects, these and other objects of the invention are accomplished by the provision of gyroscope apparatus in which a gyroscope rotor is mounted by a rotatable suspension on rotatable support means, which in turn is supported for rotation about a support axis in appropriate bearing means; inserted in the support means, between the bearing means and the rotating suspension, is a vibration attenuator comprising an inner coupling member, an outer coupling member having portions spaced radially outwardly of the inner coupling member with respect to the support axis, and resilient members which extend between and are secured to said inner coupling member and said outer coupling member and which are disposed radially of said support axis, said resilient members providing axial resilience along the direction of the support axis. Preferably there are a plurality of sets of said resilient members, these sets being spaced from each other axially along the support axis so as to provide the desired radially-strong cantilever support for the gyro rotor and suspension.

In one preferred form of the invention, each of the resilient members comprises a rod which extends from the outer coupling member and passes freely through a corresponding aperture in the inner coupling member, to which it is secured at its other end. For example, the inner coupling member is preferably a hollow cylinder having apertures through its cylindrical walls, each of the resilient rods being secured at one of its ends to the outer coupling member and passing through an aperture in one wall of the inner coupling member to the diametrically opposite wall of the inner coupling member, where it is secured. This preferred form of the invention has the advantage that, for a given maximum outer dimension of the vibration attenuator, the rods may be made thicker for a given axial resilience, and hence stronger. In another form of the vibration attenuator, the resilient members may comprise tensioned wires equiangularly spaced about the support axis, again so as to produce the desired cantilever mounting for the rotor and suspension and at the same time to provide the desired axial resilience.

We have found that a substantial portion of the vibration normally transmitted to the gyro suspension and rotor originates in the supporting bearing, and the effects of such bearing-generated vibrations are minimized by placing the vibration attenuator between the bearing and the gyro suspension. The attenuator therefore should be capable of supporting the rotor and suspension in cantilever fashion and in a dynamically balanced way, while preferably also retaining compactness of the assembly, all of which are provided by the vibration attenuator of the invention in its preferred form.

The particular preferred form of vibration attenuator described above and hereinafter, in which the resilient, radially-extending members pass through apertures in the inner coupling member, is in itself new and useful and may be effectively used in other applications in which vibration attenuation is desired.

Other objects and features of the invention will be more readily comprehended from a consideration of the following detailed description, taken in connection with the accompanying drawings, in which:

FIGURES 5a, 5b, 5c and 5d are graphical representations to which reference will be made in explaining certain advantages of the present invention;

FIGURE 6 is an enlarged sectional view of another form of vibration attenuator in accordance with the invention suitable for use in the gyroscope apparatus of FIGURE 1;

FIGURE 7 is a cross-sectional view taken along lines 7—7 of FIGURE 6; and

FIGURE 8 is a cross-sectional view taken along lines 8—8 of FIGURE 6.

Figure 1:
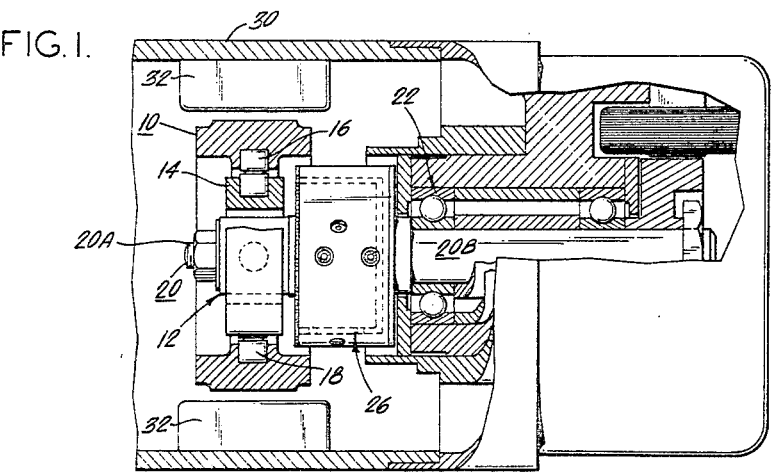
FIGURE 1 is a longitudinal section, partly in full and partly broken away, illustrating one application of the device of the invention to a gyroscope.
Figure 2:
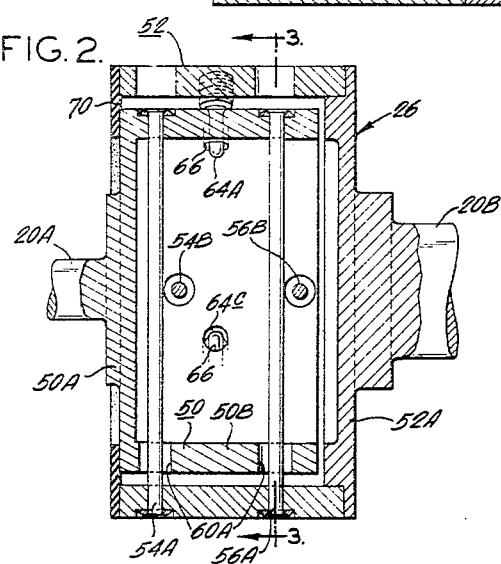
FIGURE 2 is an enlarged sectional view of one form of the vibration attenuator of the invention employed in the gyroscope system of FIGURE 1.
Figure 3:
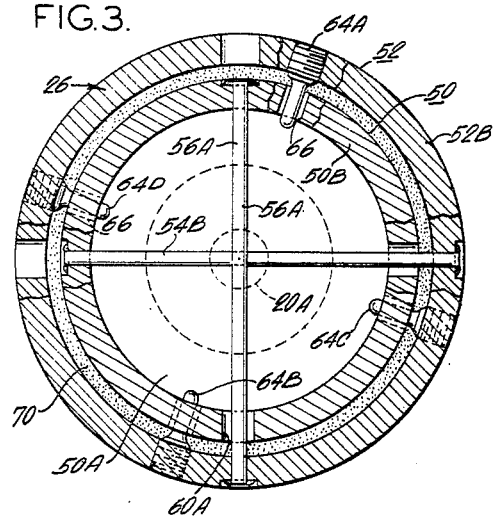
FIGURE 3 is a cross-sectional view, taken along lines 3—3 of FIGURE 2.

Referring now to the gyroscope apparatus shown in FIGURES 1, 2 and 3, there is employed in this example a gyroscope rotor 10 and rotor suspension 12 of the general type described and claimed in the above-cited copending application of E. W. Howe. In particular, the gyroscope rotor 10 is mounted on an intermediate gimbal ring 14 by means of a pair of diametrically-opposed, coaxially-aligned, torsionally-resilient pivots 16 and 18, while the gimbal ring 14 is mounted on support shaft 20 by means of a second similar pair of torsionally-resilient pivots having their axes perpendicular to those of the pivots 16 and 18. In the reference or null position of the rotor 10, the axis of support shaft 20 (hereinafter designated as the support axis) is substantially aligned with the spin axis of the rotor. One end portion 20A of shaft 20 is connected to the gyro suspension 12, while the opposite end 20B is supported for rotation in a conventional bearing arrangement 22. The shaft portions 20A and 20B are secured to each other by the rotatable vibration attenuator 26. In other words, the vibration attenuator 26 is mounted in the supporting shaft for the gyroscope rotor and suspension, between the suspension and the support bearing. In this position, the vibration attenuator 26 substantially eliminates or reduces not only vibrations applied to the gyro case 30, but also those additional vibrations generated by the support bearing.

The gyro case 30 is preferably of cylindrical form and no larger than is necessary to surround the internal portions of the gyroscope assembly. To sense tilt of the gyro rotor 10, the two pairs of pickoffs such as 32 are employed, which may be conventional E-type electromagnetic pickoffs disposed adjacent the periphery of the rotor; other types of pickoff may be employed, such as that described and claimed in copending application Ser. No. 542,645 of William M. Goodhue et al., entitled "Gyroscope Pickoff-Torquer System" and filed Apr. 14, 1966, the rotor 10 being shaped to cooperate properly with whatever type of pickoff device is used. Case 30 may be mounted on the frame, such as a rocket for example, by means of appropriate shock mounts or resilient vibration isolators.

Referring to FIGURES 2 and 3 for detailed views of a preferred form of the invention of the vibration attenuator 26, the support shaft portion 20A which is secured at one end to the gyro suspension 12 has secured to its other end an inner coupling member 50 in the form of a cup made up of a circular flange portion 50A and a hollow cylinder portion 50B; the flange and cylinder are symmetrical about, and coaxial with the support axis in shaft 20. The support shaft portion 20B which is mounted in the bearing 22 has at its other end an outer coupling member 52 in the form of a cup made up of a circular flange portion 52A and a cylindrical portion 52B; flange portion 52A and cylindrical portion 52B are symmetrical about, and coaxial with, the support axis in shaft 20, and cylindrical portion 52B surrounds, and is radially spaced from, the inner coupling member 50.

The inner and outer cylindrical coupling members in this example are secured to each other by two pairs of rods 54A, 54B and 56A, 56B. Each such rod is secured to outer coupling member 52 at one end, as by seating it in a closely-fitting hole through the cylindrical portion 52B of outer coupling member 52 and brazing or soldering it in position therein. Each of the rods, such as 54A, passes freely through an opening, such as 60A, in the adjacent wall of the inner cylindrical coupling member 50 and thence through, and normal to, the axis of support shaft portions 20A, 20B to the diametrically-opposite cylindrical portion 50B of the inner coupling member 50, where it is secured as by brazing or soldering it in a hole therein. Rod 54B is adjacent rod 54A but displaced somewhat therefrom along the support axis, and is angularly displaced with respect thereto around the support axis by 90°. Rods 56A and 56B are adjacent each other, but are displaced along the support axis from rods 54A and 54B.

Rod 56A is parallel to rod 54A and positioned in the same manner and by the same means, except for its different axial position; rod 56B is parallel to rod 54B and positioned and mounted in the same manner, except for its different axial position.

The two sets of rods 54A, 54B and 56A, 56B provide the desired strength for supporting shaft portion 20A, gyroscope suspension 12 and rotor 10 on supporting shaft portion 20B, and also for supplying driving torque from shaft portion 20B to shaft portion 20A in the present example. At the same time, the rods provide resilience along the support axis as is desired for attenuation of vibrations, as will be described more fully hereinafter.

Also preferably employed are four radially-extending stop members 64A, 64B, 64C and 64D, positioned at 90° angular intervals from each other around the support axis. Each of the stop members such as 64A is secured to the cylindrical portion 52B of outer coupling member 52, as by threading its outer end into a threaded bore in the outer coupling member; the other, or radially inward, ends of the stop members extend into corresponding holes, such as 66 in the cylindrical portion 50B of the inner coupling member 50, the holes such as 66 being somewhat larger along the direction of the support axis than the portion of the stop member extending thereinto. In the rest position, i.e. in the absence of vibrations, the inner tip of each of the stop members is preferably centered in the corresponding aperture in the inner coupling member, thereby to permit a predetermined range of relative axial motion between the inner and outer coupling members, but providing a definite maximum limit on axial displacement between these members when the stop member abuts against the inner surfaces of the aperture such as 66 into which it extends. The axial clearances provided by the apertures such as 60A in the inner coupling member for passage of the resilient rods are somewhat greater than the axial clearances provided by apertures such as 66 for the stop members. The stop members therefore come into operation before the axial vibrations are sufficient to cause the resilient rods to contact the sides of the apertures such as 60A, and therefore serve to limit the maximum axial stress upon the rods and prevent their permanent deformation or breaking.

There is also preferably employed a damping ring 70 secured to and extending between the inner and outer coupling members 50 and 52. In the present example, the vibration damper 70 may comprise a flat rubber ring extending between, and secured to, adjacent side edges of the inner and outer coupling members, as by a suitable cement or by one or more clamping rings (not shown). The damper permits relative motion between the inner and outer coupling members but serves to reduce the effective mechanical Q of the vibration attenuator, and thus reduces the magnitude of the peak in amplitude of vibratory motion between the inner coupling member and the outer coupling member which occurs at the frequency of natural resonance of the vibration attenuator.

The physical dimensions and material of the resilient rods, together with the mass of the elements connected thereto including the gyro suspension and rotor, determine the frequency response of the vibration attenuator. By way of example only, in one application of the invention in which the suspension and gyro rotor were of the general form shown in FIGURE 1 the vibration frequency of maximum response of the vibration attenuator was 120 cycles per second, which was well below the frequencies of the major resonances of the spin bearing structure and well above the resonance frequencies of the frame or platform structure on which the entire gyroscope apparatus was mounted. In this example the mass of the gyro suspension and rotor was about 0.3 pound, the axial stiffness of the vibration attenuator was about 440 pounds per inch, the rods each had a length of about 0.640 inch and were of stainless steel, the diameter of each rod was about 0.036 inch and the thickness of the damping ring was about 0.025 inch.

Figure 4:
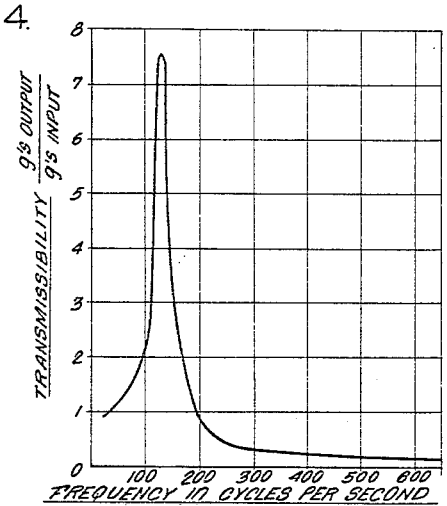
FIGURE 4 is a graphical representation illustrating certain vibration transmission characteristics of one form of vibration attenuator in accordance with the invention.

FIGURE 4 illustrates the variation of attenuation with vibration frequency obtained with the particular embodiment described above. In the latter figure, abscissae represent frequencies of input vibration applied by way of support shaft portion 20B while ordinates represent the transmissibility of the vibration attenuator, i.e. the ratio of the magnitude of output acceleration transmitted to support shaft portion 20A to the magnitude of input accelerations applied by support shaft portion 20B. As shown, the device exhibits a peak in transmissibility at about 120 c.p.s, and provides a progressively increasing attenuation as the frequency is increased above 200 c.p.s.

FIGURES 6, 7, and 8 illustrate another embodiment of the vibration attenuator of the invention. In this case the support shaft portion 20A has at its end an inner coupling member 71 consisting of a radial enlargement which is of generally cylindrical form but solid, rather than hollow as in the previous example. The outer coupling member 72 again comprises a hollow cylinder mounted on the flange 74 on the end of support shaft portion 20B. In this case the connection between the inner and outer coupling members is provided by two sets of three wires each; for example, one such set of wires 80A, 80B and 80C is positioned adjacent the end of the attenuator connected to support shaft portion 20A. Each of the latter wires is soldered at its radially inward end to a reduced-diameter portion of inner coupling member 71, the reduced diameter in this example being the same diameter as that of support shaft portion 20A. The wires extend radially of the support axis and pass through respective holes 82A, 82B and 82C in the outer coupling member 72. These wires are soldered in the last-mentioned holes in the outer coupling member while being held under equal tensions; the wires 80A, 80B and 80C are angularly displaced from each other about the supoprt axis by 120° and lie in the same plane normal to the support axis.

The second set of three wires such as 86A and 86B in FIGURE 6 is disposed adjacent the end of inner coupling member 71 which is nearer to support shaft portion 20B. Each of the latter wires is parallel to, and mounted and positioned in the same manner as, a corresponding different one of the previously-described first set of three wires, the wires of the second set being disposed in a common plane normal to the support axis and axially displaced from the plane of the first set of wires. Also employed are three stop members 90A, 90B and 90C, each of which is mounted by soldering one end in a bore in the outer coupling member 72 and each of which extends radially inwardly with respect to the support axis so that its radially-inward end is positioned in a bore in the inner coupling member 71. For example, stop member 90A has its radially-inward end extending into the center of a bore 92A in inner coupling member 70, the bore 92A being sufficiently wide and deep to accommodate the stop member and permit a substantial amount of relative axial motion between the inner and outer coupling member while limiting such motion to a predetermined maximum. In a typical example in which the latter type of vibration attenuator was designed for resonance at 60 cycles per second, a total axial stiffness or about 100 pounds per inch was achieved by utilizing six wires in the position shown, each wire having a diameter of 0.012 inch and a length of about 0.300 inch. The displacement of the two sets of wires along the support axis provides sufficient beam stiffness to support the cantilevered load of gyro suspension and rotor. Lowering of the resonant Q of the vibration attenuator can be provided in any manner as desired, for example by coating the wires with a suitable plastic damping compound.

Referring to FIGURES 5a, 5b, 5c and 5d, in all of which abscissae represent time, ordinates in FIGURE 5a show a pulsiform increase in vibration level of the bearing 22, while ordinates in FIGURE 5b represent the corresponding random drift of the spin axis of the gyro wheel 10 produced by this increase in bearing vibration level in an arrangement of the prior art in which no vibration attenuation was utilized and in which the support shaft portion 20A was directly and rigidly connected to support shaft portion 20B. As shown, the gyro drift is very substantial, and sufficient to limit the accuracy and reliability of the entire gyroscope apparatus.

In FIGURE 5c ordinates again represent the bearing vibration level, and the pulse shown therein represents a momentary increase in bearing vibration level occurring in a system embodying the vibration attenuator of the invention. In FIGURE 5d ordinates represent the gyro random drift resulting from the increase in bearing vibration level shown in FIGURE 5c when the vibration attenuator of the invention is employed, and show substantially zero drift. While all frequencies and types of vibrations are not completely eliminated by the vibration attenuator of the invention, the graphs of FIGURES 5a, 5b, 5c and 5d illustrate one type of improvement which has been observed in certain applications of the invention.

Other types and arrangements of resilient members may be employed in various applications.

While the invention has been described with particular reference to specific embodiments thereof in the interest of complete definiteness, it will be understood that it may be embodied in any of a large variety of forms without departing from the spirit and scope of the invention as defined by the appended claims.

We claim:

1. Gyroscope apparatus, comprising:
   a gyroscope rotor;
   a suspension for said rotor rotatable with said rotor as said rotor spins and permitting tilt of said rotor about at least one axis normal to its spin axis;
   bearing means; and
   support means rotatable about a support axis therein for rotatably supporting said rotatable suspension and said rotor in a cantilever fashion on said bearing means, said rotatable support means comprising a first portion mounted in said bearing means, a second portion secured to said rotatable suspension, and a vibration attenuator operatively connected to and between said first and second portions of said rotatable support means to mount them to each other and to reduce the transmission of vibrations from said first portion to said second portion;
   said vibration attenuator comprising an inner coupling member secured to one of said portions and an outer coupling member secured to the other of said portions of said rotatable support means, parts of said outer coupling member being spaced radially outwardly of said inner coupling member with respect to said support axis, a plurality of resilient members each extending between and secured to said inner coupling member and said outer coupling member and disposed radially of said support axis, each of said members being resilient along the direction of said support axis.

2. Apparatus in accordance with claim 1, in which said resilient members are arranged in a plurality of sets displaced from each other along said support axis, each of said sets being resilient along the direction of said support axis.

3. Apparatus in accordance with claim 2, in which each of said sets of resilient members comprises a plurality of flexible, filamentary elements under tension, equiangularly-spaced from each other around said support axis.

4. Apparatus in accordance with claim 3, in which each of said sets consists of three of said equiangularly-spaced filamentary elements.

5. Apparatus in accordance with claim 4, in which said plurality of sets consists of two of said sets.

6. Apparatus in accordance with claim 4, in which each of said resilient members comprises a metal wire.

7. Apparatus in accordance with claim 6, in which said inner and outer coupling members are symmetrical about said support axis.

8. Apparatus in accordance with claim 2, in which said inner coupling member is apertured to permit a portion of each of said resilient members to pass freely through it, whereby the lengths of said resilient members are greater than the radial spacing between said inner and outer coupling members.

9. Apparatus in accordance with claim 2, in which said inner coupling member comprises a hollow cylinder coaxial with said support axis, in which said cylinder contains apertures extending transversely through its cylindrical wall for each of said resilient members, and in which each of said resilient members extends through a different one of said apertures and is secured to the opposite side of said cylinder.

10. Apparatus in accordance with claim 9, in which said resilient members constitute metal rods.

11. Apparatus in accordance with claim 9, in which each of said resilient members is a rod, each of said sets comprising a pair of said rods, the two rods of each of said sets being perpendicular to each other, the rods of one of said sets being parallel to the rods of the other of said sets.

12. A vibration attenuator, comprising: an inner coupling member rotatable about a predetermined axis; an outer coupling member being rotatable aboust said axis and having portions spaced radially outward from said inner coupling member with respect to said axis; said inner coupling member having a plurality of openings therein; and a plurality of resilient members each having one of its ends secured to said outer coupling member, said each resilient member extending freely through one of said openings and being secured at its opposite end to said inner coupling member.

13. A vibration attenuator, comprising:
   an inner coupling member rotatable about a predetermined axis;
   an outer coupling member rotatable about said axis and having portions spaced radially outward from said inner coupling member with respect to said axis;
   said inner coupling member comprising a hollow cylindrical portion coaxial with said axis and disposed within said outer coupling member, said cylindrical portion having a plurality of holes through the cylinder walls thereof; and
   a plurality of resilient members extending normal to said axis, each having one of its ends secured to said outer coupling member, passing freely through one of said holes, and being secured at its other end to said inner coupling member on the opposite side of said axis.

14. The vibration attenuator of claim 13, in which different ones of said resilient members are disposed at different positions along said axis.

15. The vibration attenuator of claim 14, in which said resilient members comprise two pairs of rods, the rods of each pair extending perpendicular to each other and the rods of one of said pairs being parallel to corresponding rods of the other of said pairs.

References Cited

UNITED STATES PATENTS

| 1,480,648 | 1/1924 | Woodward. | |
| 3,286,488 | 11/1966 | Anderson et al. | 64—12 |
| 3,301,073 | 1/1967 | Howe | 74—57 |
| 3,315,533 | 4/1967 | Litty | 74—.5 |

FOREIGN PATENTS

| 574,499 | 5/1935 | Germany. |

C. J. HUSAR, Primary Examiner.

U.S. Cl. X.R.

64—12